US012630021B2

(12) United States Patent
Brolles et al.

(10) Patent No.: US 12,630,021 B2
(45) Date of Patent: May 19, 2026

(54) METHOD FOR MONITORING THE WEAR OF A POWERTRAIN OF AN ELECTRIC VEHICLE AND ELECTRIC VEHICLE IMPLEMENTING SAID METHOD

(71) Applicant: VOLVO TRUCK CORPORATION, Gothenburg (SE)

(72) Inventors: Vincent Brolles, Saint Laurent de Mure (FR); Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 78 days.

(21) Appl. No.: 18/664,954

(22) Filed: May 15, 2024

(65) Prior Publication Data

US 2024/0424908 A1     Dec. 26, 2024

(30) Foreign Application Priority Data

Jun. 20, 2023    (EP) ..................................... 23180441

(51) Int. Cl.
| | |
|---|---|
| *B60L 3/12* | (2006.01) |
| *B60L 15/20* | (2006.01) |
| *F16H 57/01* | (2012.01) |
| *G01M 13/021* | (2019.01) |
| *G01M 99/00* | (2011.01) |

(52) U.S. Cl.
CPC ................ *B60L 3/12* (2013.01); *B60L 15/20* (2013.01); *F16H 57/01* (2013.01); *G01M 13/021* (2013.01); *G01M 99/007* (2013.01); *B60L 2240/423* (2013.01); *F16H 2057/012* (2013.01)

(58) Field of Classification Search
None
See application file for complete search history.

(56) References Cited

U.S. PATENT DOCUMENTS

| | | | |
|---|---|---|---|
| 10,498,193 | B2 | 12/2019 | Henderson et al. |
| 2010/0235027 | A1 | 9/2010 | Park et al. |
| 2022/0205525 | A1 | 6/2022 | Kuehn |
| 2024/0369130 | A1* | 11/2024 | Riedel ..................... F16H 57/01 |

FOREIGN PATENT DOCUMENTS

| | | | |
|---|---|---|---|
| DE | 102018215894 A1 | 3/2020 | |
| EP | 915795 B1 | 10/2001 | |
| EP | 3734117 A1 | 11/2020 | |
| WO | 2007000449 A1 | 1/2007 | |

OTHER PUBLICATIONS

European Search Report for EP Patent Application No. 23180441, mailed Nov. 6, 2023, 2 pages.

* cited by examiner

*Primary Examiner* — Todd Melton
(74) *Attorney, Agent, or Firm* — Sage Patent Group

(57)     ABSTRACT

The method for monitoring the wear of a powertrain includes an analysis cycle that includes, in this order, preventing mechanical components from moving; rotating an electric motor in a first direction until a torque value delivered by the electric motor reaches a predetermined threshold, a first angular position of the electric motor being reached; rotating the electric motor in a second direction opposite to the first direction until a torque value delivered by the electric motor reaches the predetermined threshold, a second angular position of the electric motor being reached; and calculating a backlash value of the powertrain on the basis of the first and second angular positions. The method further includes comparing the backlash value calculated during the analysis cycle to a reference value to monitor wear of the powertrain.

13 Claims, 3 Drawing Sheets

METHOD FOR MONITORING THE WEAR OF A POWERTRAIN OF AN ELECTRIC VEHICLE AND ELECTRIC VEHICLE IMPLEMENTING SAID METHOD

CROSS REFERENCE TO RELATED APPLICATION

This application claims priority to European Patent Application Number 23180441.0, filed on Jun. 20, 2023, the disclosure and content of which is incorporated by reference herein in its entirety.

TECHNICAL FIELD

The disclosure relates generally to electric vehicles. In particular aspects, the disclosure relates to a method for monitoring the wear of a powertrain of an electric vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Electric vehicles using electric motor for propulsion are generally more reliable than vehicles using an internal combustion engine for propulsion, due to a simpler powertrain design. However, heavy electric vehicles, such as trucks, buses and construction equipment, are usually equipped with a more complex powertrain than light vehicle, such as car, and can for example be equipped with a multi-speed transmission.

To ensure vehicle reliability and avoid costly breakdowns, it is important to monitor powertrain wear. This monitoring can be achieved by physical inspection of the vehicle, which is costly and often inefficient for detecting mechanical wear of internal parts of the powertrain, such as gears in the transmission. Therefore, there is a need for an easy to implement method to monitor the wear of the powertrain of an electric vehicle.

SUMMARY

According to a first aspect of the disclosure, the disclosure relates to a method for monitoring the wear of a powertrain of an electric vehicle, the powertrain comprising at least one electric motor and a drivetrain, the drivetrain being configured to deliver a motor torque produced by the electric motor to mechanical components of the electric vehicle to drive the mechanical components The method comprises an analysis cycle that includes, in this order:

preventing the mechanical components from moving;

rotating the electric motor in a first direction of rotation until a torque value delivered by the electric motor reaches a predetermined threshold, a first angular position of the electric motor being reached;

rotating the electric motor in a second direction of rotation opposite to the first direction of rotation until a torque value delivered by the electric motor reaches the predetermined threshold, a second angular position of the electric motor being reached;

calculating a backlash value of the powertrain on the basis of the first angular position and of the second angular position.

The method further comprises comparing the backlash value calculated during the analysis cycle to a reference value to monitor wear of the powertrain.

The first aspect of the disclosure may seek to monitor the wear of the powertrain of the vehicle. A technical benefit may include detecting a wear or a defect of the powertrain when the backlash value changes, and improving the maintenance and the durability of the vehicle.

Optionally in some examples, including in at least one preferred example, the analysis cycle further includes: after the rotation of the electric motor in the first direction of rotation, measuring the first angular position of the electric motor; after the rotation of the electric motor in the second direction of rotation, measuring the second angular position of the electric motor. The backlash value is calculated as the difference between the first angular position and the second angular position. A technical benefit may include obtaining a more precise monitoring of the wear of the powertrain.

Optionally in some examples, including in at least one preferred example, prior to the rotation of the electric motor in the first direction of rotation during the analysis cycle, the electric motor is in an initial angular position, and the analysis cycle further includes: calculating a first direction backlash value of the powertrain on the basis of the first angular position and of the initial angular position, and calculating a second direction backlash value of the powertrain on the basis of the second angular position and of the initial angular position. Furthermore, the method further comprises comparing the first direction backlash value and the second direction backlash value calculated during the analysis cycle to reference values to monitor wear of the powertrain. A technical benefit may include obtaining a more precise monitoring of the wear of the powertrain.

Optionally in some examples, including in at least one preferred example, the analysis cycle further includes: prior to the rotation of the electric motor in the first direction of rotation, measuring the initial angular position of the electric motor. The first direction backlash value is calculated as the difference between the first angular position and the initial angular position. The second direction backlash value is calculated as the difference between the initial angular position and the second angular position. A technical benefit may include obtaining a more precise monitoring of the wear of the powertrain.

Optionally in some examples, including in at least one preferred example, the method further comprises a reference cycle, performed before the analysis cycle, wherein the reference cycle includes, in this order: preventing the mechanical components from moving; rotating the electric motor in the first direction of rotation until a torque value delivered by the electric motor reaches the predetermined threshold, a first reference angular position of the electric motor being reached; rotating the electric motor in the second direction of rotation until a torque value delivered by the electric motor reaches the predetermined threshold, a second reference angular position of the electric motor being reached; calculating a reference backlash value of the powertrain on the basis of the first reference angular position and of the second reference angular position. The reference value against which the backlash value calculated during the analysis cycle is compared is the reference backlash value calculated during the reference cycle. A technical benefit may include obtaining a more precise monitoring of the wear of the powertrain.

Optionally in some examples, including in at least one preferred example, the reference cycle further includes: after the rotation of the electric motor in the first direction of rotation, measuring the first reference angular position of the electric motor; after the rotation of the electric motor in the second direction of rotation, measuring the second reference angular position of the electric motor. The reference backlash value is calculated as the difference between the first reference angular position and the second reference angular position. A technical benefit may include obtaining a more precise monitoring of the wear of the powertrain.

Optionally in some examples, including in at least one preferred example, prior to the rotation of the electric motor in the first direction of rotation during the reference cycle, the electric motor is in an initial reference angular position, and the reference cycle further includes: calculating a first direction reference backlash value of the powertrain on the basis of the first reference angular position and of the initial reference angular position, and calculating a second direction reference backlash value of the powertrain on the basis of the second reference angular position and of the initial reference angular position. The reference values against which the first direction backlash value and the second direction backlash value calculated during the analysis cycle are compared are respectively the first direction reference backlash value and the second direction reference backlash value. A technical benefit may include obtaining a more precise monitoring of the wear of the powertrain.

Optionally in some examples, including in at least one preferred example, the initial cycle further includes: prior to the rotation of the electric motor in the first direction of rotation, measuring an initial reference angular position of the electric motor. The first direction reference backlash value is calculated as the difference between the first reference angular position and the initial reference angular position. The second direction reference backlash value is calculated as the difference between the initial reference angular position and the second reference angular position. A technical benefit may include obtaining a more precise monitoring of the wear of the powertrain.

Optionally in some examples, including in at least one preferred example, the analysis cycle is performed after a driver of the electric vehicle requests the electric vehicle to start, and before the vehicle actually starts, and/or after a driver of the electric vehicle requests the electric vehicle to stop, and before the vehicle actually stops. A technical benefit may include performing the analysis cycle without affecting the driver of the vehicle.

Optionally in some examples, including in at least one preferred example, the electric vehicle is a rechargeable battery electric vehicle, the electric motor being powered by a battery, and the analysis cycle is performed during a recharge of the battery. A technical benefit may include performing the analysis cycle without affecting a driver of the vehicle.

Optionally in some examples, including in at least one preferred example, the method further comprises repeating the analysis cycle over time to monitor an evolution over time of the backlash values calculated during the repeated analysis cycles. A technical benefit may include obtaining a more precise monitoring of the evolution of the wear of the powertrain over time.

Optionally in some examples, including in at least one preferred example, the drivetrain comprises a gearbox having multiple gear ratio, and the method is performed for each gear ratio of the gearbox, to calculate a backlash value of the powertrain for each gear ratio of the gearbox. A technical benefit may include locating the position of wear within the powertrain.

Optionally in some examples, including in at least one preferred example, the mechanical components of the vehicle include drive wheels of the vehicle, and, during the analysis cycle of the method, braking is applied on the vehicle to prevent the movement of the vehicle and of the drive wheels. A technical benefit may include locating the position of wear within the powertrain.

According to a second aspect of the disclosure, the disclosure relates to a vehicle comprising mechanical components, a powertrain including at least one electric motor and a drivetrain, the drivetrain being configured to deliver a motor torque produced by the electric motor to the mechanical components to drive the mechanical components, a sensor, configured to measure an angular position of the electric motor, and a control unit. The control unit is configured to perform the method described here above. The second aspect of the disclosure may seek to facilitate the maintenance of the vehicle thanks to an easy detection of a wear or defect of the powertrain.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
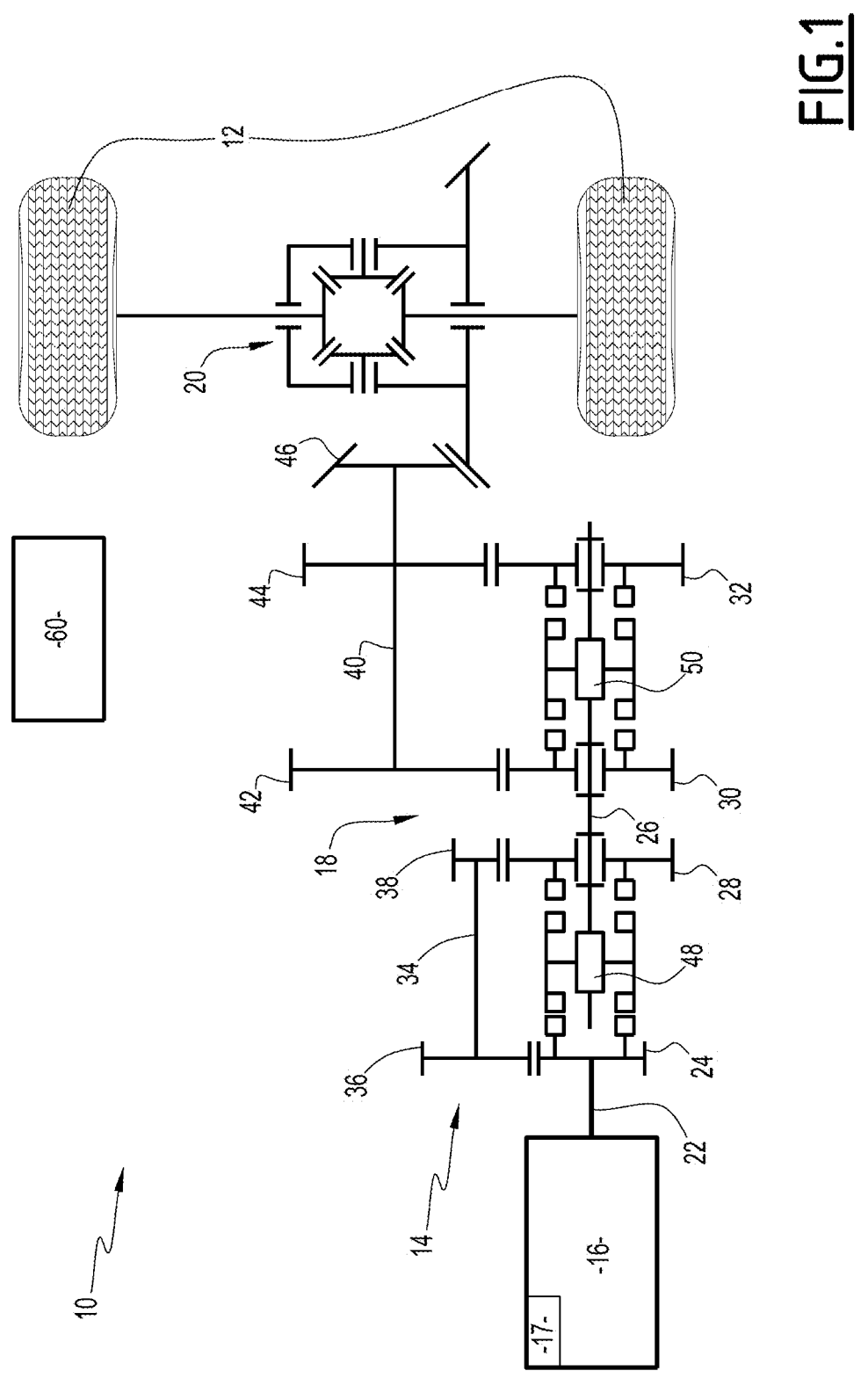
FIG. 1 is an exemplary diagram showing a vehicle according to the invention.

A vehicle 10 according to an example is shown in the exemplary diagram of FIG. 1. The vehicle 10 is for example a heavy-duty vehicle, preferably a truck, a bus or a construction equipment.

The vehicle 10 comprises two drive wheels 12 and a powertrain 14. In other examples, the vehicle 10 may comprises more than two drive wheels.

The powertrain 14 is used to drive mechanical components, which in the example are the drive wheels 12.

The powertrain 14 comprises an electric motor 16, a drivetrain 18 and a differential 20. The electric motor 16 comprises a motor shaft 22 on which is mounted a motor gear 24, the motor gear being integral with the motor shaft. The electric motor 16 propels the drive wheels 12 through the drivetrain 18 and the differential 20, that is, the electric motor 16 delivers a motor torque to the drivetrain 18, which is then delivered to the differential 20 and the drive wheels 12.

The vehicle 10 comprises sensors 17, which are configured to measure an angular position θ of the electric motor 16, expressed in ° (degrees), and to measure a motor torque delivered by the electric motor to the drivetrain 18, expressed in N.m (Newton-meter). In the example, the sensors 17 are integrated into the electric motor 16.

For example, the sensors 17 measure the angular position θ of the electric motor by measuring the angular position of the motor shaft 22 relative to a housing of the electric motor.

The drivetrain 18 comprises a transmission, which is, in the example, a four-speed gearbox. In other words, the gearbox has four gear ratio. The gearbox comprises a main shaft 26, on which a first main gear 28, a second main gear 30 and a third main gear 32 are mounted to rotate freely about the main shaft. The gearbox also comprises a counter shaft 34, on which are mounted a first counter gear 36, meshing with the motor gear 24, and a second counter gear 38, meshing with the first main gear 28. The first and second counter gears are integral, that is, fixed, with the counter shaft. The gearbox also comprises an output shaft 40, on which are mounted a first output gear 42, meshing with the second main gear 30, a second output gear 44, meshing with the third main gear 32, and a third output gear 46, meshing with a crown gear of the differential 20. The third output gear 46 is also called a pinion gear. The first, second and third output gears are integral, that is, fixed, with the output shaft.

The gearbox also comprises a first dog clutch 48 and a second dog clutch 50. The first dog clutch 48 can be engaged with the motor gear 24 or with the first main gear 28, to couple the motor gear 24 or the first main gear 28 with the main shaft 26. When the first dog clutch 48 is engaged with the motor gear 24 or with the first main gear 28, a motor torque delivered by the electric motor 16 to the motor shaft 22 is transmitted to the main shaft 26. The second dog clutch 50 can be engaged with the second main gear 30 or with the third main gear 32, to couple the second main gear 30 or the third main gear 32 with the main shaft 26. When the second dog clutch 50 is engaged with the second main gear 30 or with the third main gear 32, and when the first dog clutch 48 is engaged with the motor gear 24 or with the first main gear 28, a motor torque delivered by the electric motor 16 to the motor shaft 22 is transmitted to the main shaft 26, then to the output shaft 40 and then to the differential 20 and the drive wheels 12. Hence, in these configurations, the drivetrain delivers a motor torque produced by the electric motor 16 to the drive wheels 12, and the drivetrain is said to be in a coupled configuration.

Therefore, the drivetrain of the example offers four coupled configurations, and the gearbox comprises four speeds, or four gear ratios, depending of the gears with which the dog clutches 48 and 50 are engaged.

When the first dog clutch 48 is disengaged from the motor gear 24 and from the first main gear 28, and/or when the second dog clutch 50 is disengaged from the second main gear 30 and from the third main gear 32, the electric motor 16 is disconnected from the output shaft 40, the differential 20 and the drive wheels 12, and the drivetrain 18 is said to be in an uncoupled configuration. In the example, the drivetrain has three uncoupled configuration. In a first uncoupled configuration, the first dog clutch 48 and the second clutch 50 are disengaged from the corresponding gears, and the main shaft 26 is not driven by the motor shaft 22. In a second uncoupled configuration, the first dog clutch 48 is disengaged from the motor gear 24 and from the first main gear 28 and the second dog clutch 50 is engaged with the second main gear 30 or with the third main gear 32, and the main shaft 26 is not driven by the motor shaft 22, as in the first uncoupled configuration. In a third uncoupled configuration, the first dog clutch 48 is engaged with the motor gear 24 or with the first main gear 28 and the second dog clutch 50 is disengaged from the second main gear 30 and from the third main gear 32, and the main shaft 26 is therefore driven by the motor shaft 22 but the output shaft 40 is not driven by the main shaft 26.

In the example, the first, second and third main gears 28, 30 and 32 are mounted onto the main shaft 26 through bearing, shown but not referenced in FIG. 1. Furthermore, in the example, the motor shaft 22, the main shaft 26, the counter shaft 34 and the output shaft 40 are mounted onto a housing of the vehicle 10 through bearings, not shown in FIG. 1, so as to freely rotate relative to the housing with minimal friction. Said housing of the vehicle 10 is mounted onto a chassis of the vehicle.

In the example, the electric motor 16 is powered by a rechargeable battery, not shown in the diagram of FIG. 1. As a variant, the electric motor is powered by other means, such as by a fuel cell.

The vehicle 10 also comprises a control unit 60.

Figure 2:
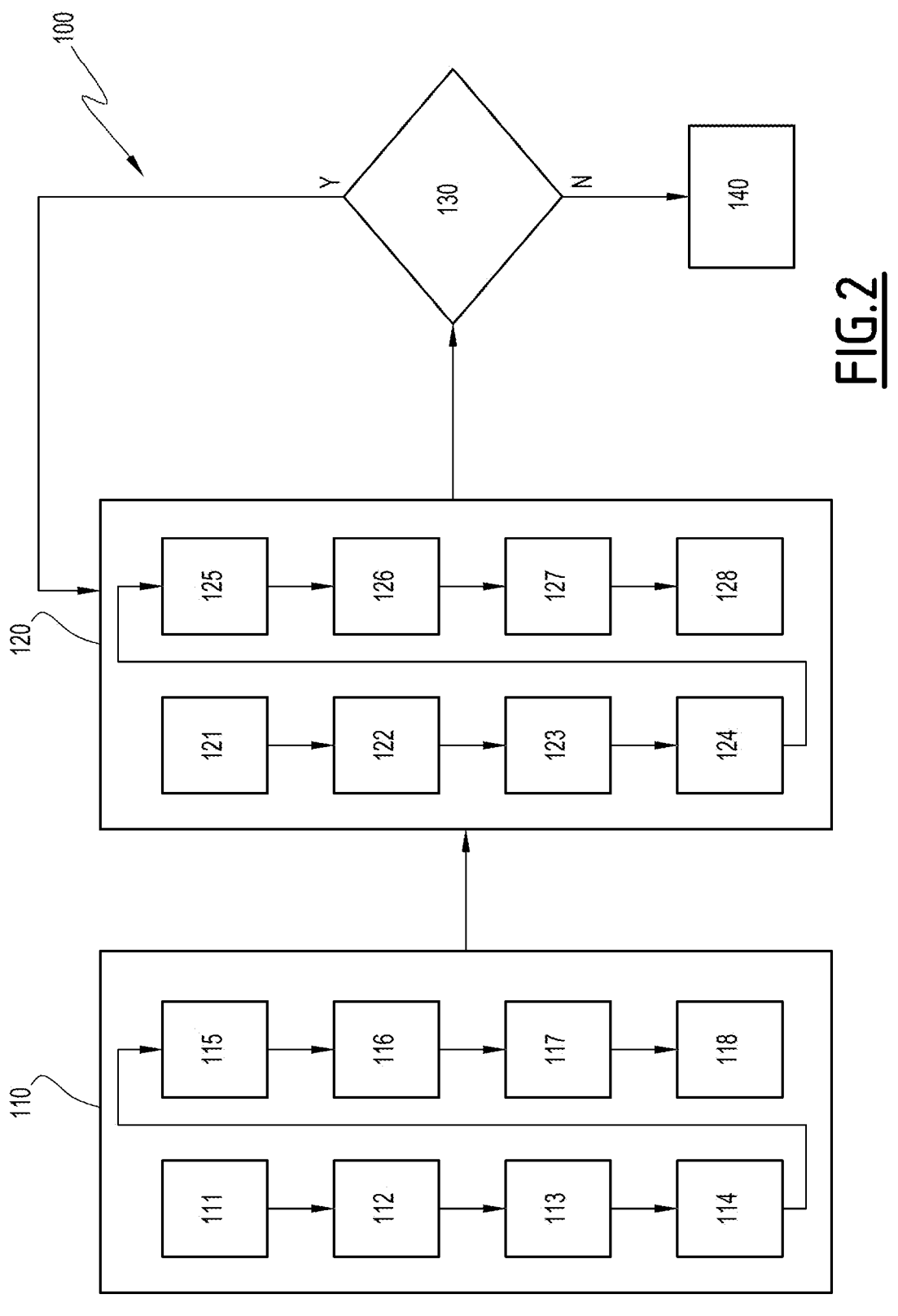
FIG. 2 is an exemplary flowchart of a method according to an example for operating the vehicle of FIG. 1.
Figure 3:
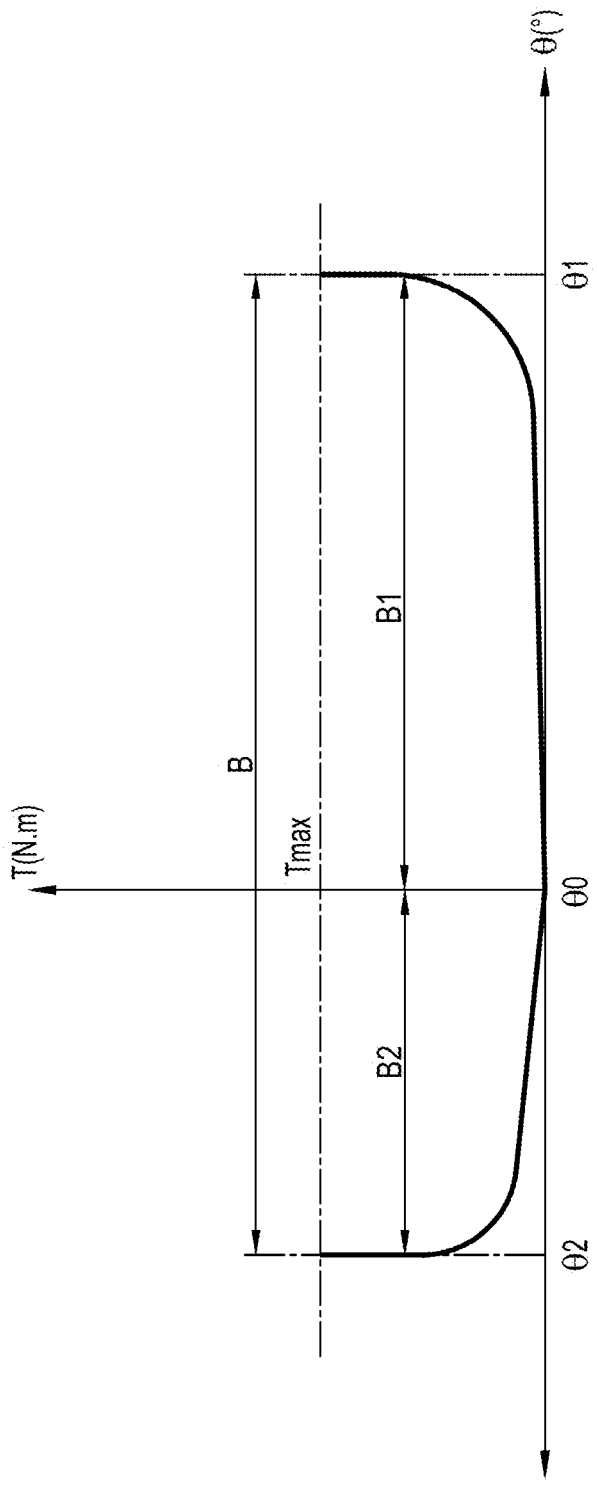
FIG. 3 is an exemplary diagram illustrating the implementation of steps of the method shown in the diagram in FIG. 2.

A method 100 for monitoring the wear of the powertrain 14 of the vehicle 10 is now described, with reference to FIGS. 2 and 3.

Preferably, the method 100 is performed by the control unit 60.

All moving mechanical parts of the powertrain 14 have clearance for proper operation. These clearances are determined during the manufacturing of the powertrain, but can increase over time because of wear.

The method 100 aims to monitor the wear of the powertrain 14 by monitoring an evolution over time of the backlash of the mechanical parts of the powertrain, including the electric motor 16 and the drivetrain 18, said backlash being caused by the clearances between the moving mechanical parts of the powertrain.

In the example, the mechanical parts of the powertrain for which the wear is monitored thanks to the method 100 are internal moveable parts of the electric motor 16, the motor shaft 22, the motor gear 24, the main shaft 26, the first, second and third main gears 28, 30 and 32, the counter shaft 34, the first and second counter gears 36, 38, the output shaft 40, the first, second and third output gears 42, 44 and 46, and the differential 20.

For two gears meshing, a backlash value of the two gears is defined as the maximum angular distance through which one of the gears may be moved in one direction without applying a significant force or motion to the other gear in mechanical sequence.

Thus, by generalizing, a backlash value of the powertrain 14 is defined as the maximum angular distance through which the electric motor 16 may be moved in one direction without delivering a significant torque. In other words, the backlash value of the powertrain 14 corresponds to the angular distance between a first angular position of the electric motor 16 in which the electric motor can deliver a significant torque to the drivetrain 18 by rotating in a first direction of rotation, and a second angular position of the electric motor in which the electric motor can deliver a significant torque to the drivetrain by rotating in a second direction of rotation opposed to the first direction of rotation. This angular distance corresponds to the angular distance necessary to compensate for all the clearances in the powertrain.

Hence, an evolution of the backlash value of the powertrain 14 over time is representative of an evolution of the wear of the powertrain.

It is to be understood that, in order to measure a backlash value of the powertrain, the mechanical components driven by the powertrain 14, which in the example are the drive wheels 12, must be prevented from moving so that a significant motor torque can be transmitted from the electric motor 16 to the drivetrain 18, and the gearbox must be in a coupled configuration.

The method 100 starts with a reference cycle 110.

Preferably, the reference cycle 110 is performed after the vehicle 10 has been manufactured but before it is put into service. Alternatively, the reference cycle 110 is performed after the vehicle 10 is put into service and after a running-in, or break-in, period.

According to an example, the reference cycle 110 is performed during a recharge of the battery of the vehicle 10.

According to another example, the reference cycle 110 is performed after a driver of the electric vehicle 10 requests the electric vehicle to start, and before the vehicle actually starts, or is performed after a driver of the electric vehicle requests the electric vehicle to stop, and before the vehicle actually stops.

The reference cycle 110 starts with an immobilization step 111, in which the drive wheels 12 of the vehicle 10 are prevented from moving, for example by applying braking to the drive wheels 12 or to non-drive wheels of the vehicle. Furthermore, prior to, or during, the immobilization step 111, the drivetrain 18 is set in a coupled configuration. For example, the first dog clutch 48 is engaged with the motor gear 24 and the second dog clutch 50 is engaged with the second main gear 30.

The reference cycle 110 then comprises a measuring step 112, during which an initial reference angular position $\theta0_{ref}$ of the electric motor 16 is measured, preferably with the sensors 17. In the example, the initial reference angular position $\theta0_{ref}$ is arbitrarily defined as a zero value, that is, equal to 0°.

The reference cycle 110 then comprises a rotation step 113, during which the electric motor 16 is rotated in a first direction of rotation until a torque value delivered by the electric motor reaches a predetermined threshold Tmax. The torque value delivered by the electric motor is preferably measured with the sensors 17. The predetermined threshold value Tmax is preferably comprised between 100 N.m and 600 N.m, for example equal to 300 N.m.

During the rotation step 113, all the clearances in the powertrain 14 are progressively compensated, until all mechanical parts of the powertrain are in contact with each other and able to transmit a torque in the first direction of movement. In other words, before the predetermined threshold Tmax is reached, the torque transmitted by the electric motor 16 to the drivetrain 18 is low, as this torque is only used to compensate for the clearances. On the contrary, once all the clearances are compensated, the torque transmitted by the electric motor 16 to the drivetrain 18 rapidly increases, until it reaches the predetermined threshold Tmax, as this torque is transmitted by the drivetrain to the drive wheels 12 and as the drive wheels 12 are prevented from moving through braking.

When the predetermined threshold Tmax is reached, the electric motor 16 reaches a first reference angular position $\theta1_{ref}$.

The reference cycle 110 then comprises a measuring step 114, during which the angular position of the electric motor 16 is measured, preferably with the sensors 17, to establish a value of the first reference angular position $\theta1_{ref}$. In the example, the first reference angular position $\theta1_{ref}$ is defined relative to the initial reference angular position $\theta0_{ref}$ and is expressed in degree (°), with a positive value.

The reference cycle 110 then comprises a rotation step 115, during which the electric motor 16 is rotated in a second direction of rotation, opposite to the first direction of rotation, until a torque value delivered by the electric motor reaches the predetermined threshold Tmax. The torque value delivered by the electric motor is preferably measured with the sensors 17. It is to be noted that the same predetermined threshold value Tmax is used for both rotation steps 113 and 115 of the reference cycle 110.

During the rotation step 115, when the predetermined threshold Tmax is reached, the electric motor 16 reaches a second reference angular position $\theta2_{ref}$.

Similar to what has been described above with reference to step 113, during the rotation step 115, all the clearances in the powertrain 14 are progressively compensated, until all mechanical parts of the powertrain are in contact with each other and able to transmit a torque in the second direction of movement.

The reference cycle 110 then comprises a measuring step 116, during which the angular position of the electric motor 16 is measured, preferably with the sensors 17, to establish a value of the second reference angular position $\theta2_{ref}$. In the example, the second reference angular position is defined relative to the initial reference angular position $\theta0_{ref}$ and is expressed in degree (°), with a negative value.

The reference cycle 110 then comprises a calculating step 117, during which a reference backlash value $B_{ref}$ of the powertrain 14 is calculated, on the basis of the first reference angular position $\theta1_{ref}$ and of the second reference angular position $\theta2_{ref}$. Here, the reference backlash value $B_{ref}$ is calculated as the difference between the first reference angular position and the second reference angular position, and is expressed in degrees (°).

Preferably, the reference cycle 110 then comprises a calculating step 118, during which a first direction reference backlash value $B1_{ref}$ of the powertrain 14 is calculated, on the basis of the first reference angular position $\theta1_{ref}$ and of the initial reference angular position $\theta0_{ref}$, and a second direction reference backlash value $B2_{ref}$ of the powertrain 14 is calculated, on the basis of the second reference angular position $\theta2_{ref}$ and of the initial reference angular position $\theta0_{ref}$. Here, the first direction reference backlash value is calculated as the difference between the first reference angular position and the initial reference angular position, and the second direction reference backlash value is calculated as the difference between the initial reference angular position and the second reference angular position. Hence, the reference backlash value $B_{ref}$ is equal to the sum of the first direction reference backlash value $B1_{ref}$ and of the second direction reference backlash value $B2_{ref}$, the reference values $B1_{ref}$ and $B21_{ref}$ being positive.

At the end of the reference cycle 110, an initial state of the powertrain 14 is established, represented by the reference backlash values $B_{ref}$, $B1_{ref}$ and $B2_{ref}$ calculated during the steps 117 and 118. This initial state is representative of the state of the powertrain 14 after its manufacturing, or after its running-in period, depending on when the reference cycle 110 is performed.

After the reference cycle 110, the method 100 comprises an analysis cycle 120.

The analysis cycle 120 is performed during the life of the vehicle 10, when it is desired to check the wear of the powertrain 14.

According to an example, the analysis cycle 120 is performed during a recharge of the battery of the vehicle 10.

According to another example, the analysis cycle 120 is performed after a driver of the electric vehicle 10 requests the electric vehicle to start, and before the vehicle actually starts, or is performed after a driver of the electric vehicle requests the electric vehicle to stop, and before the vehicle actually stops.

The analysis cycle 120 starts with an immobilization step 121, in which the drive wheels 12 of the vehicle 10 are prevented from moving, for example by applying braking to the drive wheels 12 or to non-drive wheels of the vehicle. Furthermore, prior to, or during, the immobilization step 121, the drivetrain 18 is set in the same coupled configuration as in the reference cycle 110, that is, the same gear ratio of the gearbox is engaged. Hence, in the example, the first dog clutch 48 is engaged with the motor gear 24 and the second dog clutch 50 is engaged with the second main gear 30.

The analysis cycle 120 then comprises a measuring step 122, during which an initial angular position $\theta 0$ of the electric motor 16 is measured, preferably with the sensors 17. In the example, the initial angular position $\theta 0$ is arbitrarily defined as a zero value, that is, equal to 0°.

The analysis cycle 120 then comprises a rotation step 123, during which the electric motor 16 is rotated in the first direction of rotation until a torque value delivered by the electric motor reaches the predetermined threshold Tmax. The torque value delivered by the electric motor is preferably measured with the sensors 17. It is to be noted that the same predetermined threshold value Tmax, first direction of rotation and second direction of rotation are used for the reference cycle 110 and for the analysis cycle 120.

Similar to what has been described above with reference to steps 113 and 115 of the reference cycle 110, during the rotation step 123 of the analysis cycle 120, all the clearances in the powertrain 14 are progressively compensated, until all mechanical parts of the powertrain are in contact with each other and able to transmit a torque in the second direction of movement.

When the predetermined threshold Tmax is reached, the electric motor 16 reaches a first angular position $\theta 1$.

The analysis cycle 120 then comprises a measuring step 124, during which the angular position of the electric motor 16 is measured, preferably with the sensors 17, to establish a value of the first angular position $\theta 1$. In the example, the first angular position $\theta 1$ is defined relative to the initial angular position $\theta 0$, and is expressed in degree (°), with a positive value.

The analysis cycle 120 then comprises a rotation step 125, during which the electric motor 16 is rotated in the second direction of rotation, until a torque value delivered by the electric motor reaches the predetermined threshold Tmax. The torque value delivered by the electric motor is preferably measured with the sensors 17.

During the rotation step 125, when the predetermined threshold Tmax is reached, the electric motor 16 reaches a second angular position $\theta 2$.

Similar to what has been described above with reference to step 113 and 115 of the reference cycle 110, during the rotation step 125, all the clearances in the powertrain 14 are progressively compensated, until all mechanical parts of the powertrain are in contact with each other and able to transmit a torque in the second direction of movement.

The analysis cycle 120 then comprises a measuring step 126, during which the angular position of the electric motor 16 is measured, preferably with the sensors 17, to establish a value of the second angular position $\theta 2$. In the example, the second angular position is defined relative to the initial angular position, and is expressed in degree (°), with a negative value.

The analysis cycle 120 then comprises a calculating step 127, during which a backlash value B of the powertrain 14 is calculated, on the basis of the first angular position $\theta 1$ and of the second angular position $\theta 2$. Here, the backlash value B is calculated as the difference between the first angular position $\theta 1$ and the second angular position $\theta 2$, and is expressed in degrees (°).

Preferably, the analysis cycle 120 then comprises a calculating step 128, during which a first direction backlash value B1 of the powertrain 14 is calculated, on the basis of the first angular position $\theta 1$ and of the initial angular position $\theta 0$, and a second direction backlash value B2 of the powertrain 14 is calculated, on the basis of the second angular position $\theta 2$ and of the initial angular position $\theta 0$. Here, the first direction backlash value B1 is calculated as the difference between the first angular position $\theta 1$ and the initial angular position $\theta 0$, and the second direction backlash value B2 is calculated as the difference between the initial angular position $\theta 0$ and the second angular position $\theta 2$. Hence, the backlash value B is equal to the sum of the first direction backlash value B1 and of the second direction backlash value B2, the reference values $B1_{ref}$ and $B21_{ref}$ being positive.

On FIG. 3, the movements of the electric motor 16 during the analysis cycle 120 are represented. The graph in FIG. 3 shows the angular position $\theta$ of the electric motor 16 on the horizontal axis, and the motor torque T delivered by the electric motor on the vertical axis. During the measuring step 122, the electric motor 16 is in a steady state condition and delivers no motor torque, and the angular position $\theta$ corresponds to the initial angular position $\theta 0$.

During the rotation step 123, the angular position $\theta$ increases progressively. As the clearance of the mechanical parts of the powertrain 14 is progressively compensated by the rotation of the electric motor, the motor torque T increases at the same time. Then, when all the clearances in the powertrain are compensated, the motor torque T increases rapidly and reaches an asymptote. Furthermore, when the motor torque T reaches the predetermined threshold Tmax, the electric motor 16 is in the first angular position $\theta 1$.

Then, during the rotation step 125, the angular position $\theta$ decreases progressively and the motor torque T becomes equal to zero until the angular position $\theta$ reaches the initial angular position $\theta 0$. Then, the angular position $\theta$ continues to decrease, and as the clearance of the mechanical parts of the powertrain 14 is progressively compensated by the rotation of the electric motor, the motor torque T increases at the same time. Then, when all the clearances in the powertrain are compensated, the motor torque T increases rapidly and reaches an asymptote. Furthermore, when the motor torque T reaches the predetermined threshold Tmax, the electric motor 16 is in the second angular position $\theta 2$.

FIG. 3 shows that the backlash value B is equal to the difference between the first angular position $\theta 1$ and the second angular position $\theta 2$, expressed in degrees.

Preferably, the rotation of the electric motor 16 during the rotation steps 113, 115, of the reference cycle 110, and during the rotation steps 123 and 125 of the analysis cycle 120, is comprised between 10 rpm and 50 rpm. This relatively slow rotational speed allows to progressively bring together all mechanical parts within the powertrain 14 while allowing for a precise measurement of the angular position of the electric motor.

After performing the analysis cycle 120, the method 100 comprises a comparison step 130, in which the backlash value B obtained during the analysis cycle 120 is compared to the reference backlash value $B_{ref}$ obtained during the reference cycle 110, and in which, preferably, the first direction backlash value B1 and the second direction backlash value B2 obtained during the analysis cycle 120 are respectively compared to the first direction reference backlash value $B1_{ref}$ and the second direction reference backlash value $B2_{ref}$ obtained during the reference cycle 110, to monitor the evolution of the wear of the powertrain.

The comparison of the backlash values B, B1 and B2 obtained at the end of the analysis cycle 120, with the reference backlash values $B_{ref}$, $B1_{ref}$ and $B2_{ref}$ obtained at the end of the reference cycle 110, allows to detect an evolution in the wear of the powertrain 14, which corresponds to an evolution in the clearances between the mechanical parts of the electric motor 16 and of the drivetrain 18. In other words, the evolution of said clearances is representative of a degradation, or wear, of the parts of the powertrain 14. Hence, based on the evolution of the backlash values, it is possible to detect wear and degradation of said parts. B1, B1ref, B2 and B2ref could not be compared because the "zero" (θ0) is never the same. Consequently, only B and B ref could be compared.

Essentially, the evolution of the backlash values can show an increase of wear of the powertrain, or a stagnation of the wear of the powertrain, the latter being a sign of good health of the powertrain.

For example, an increase in the backlash values, corresponding to an increase in the clearance between said parts, can be sign of:
- a gear teeth wear;
- a bearing damage or wear;
- a shaft bending, damage or wear;
- an adjusting shim damage or wear; and/or
- a transmission shaft splines wear.

Hence, various defects and wear cause of the powertrain 14 can be detected during the comparison step 130.

After the comparison step 130, if a significant evolution of the wear of the powertrain 14 is detected, that is, if a defect is detected, the method 100 ends with an alert step 140, during which an alert is emitted to the attention of a driver or a controller of the vehicle 10, informing of the existence of a defect in the powertrain 14 and alerting that maintenance should be performed on the powertrain.

On the contrary, if no evolution of the wear of the powertrain is detected, that is, if the backlash values B, B1 and B2 are close or identical to the reference backlash values $B_{ref}$, $B1_{ref}$ and $B2_{ref}$, the method 100 continues. In the example, after a waiting period, the method 100 repeats an analysis cycle 120, an then a comparison step 130, as described above. The waiting period is, for example, defined as a number of days, or weeks, before the analysis cycle 120 is repeated. Alternatively, the waiting period is defined as a distance to be travelled by the vehicle 10 before the analysis cycle 120 is repeated.

Hence, the method 100 continues to monitor the evolution over time of the wear of the powertrain 14 during the use of the vehicle 10, by monitoring the evolution of the backlash values B, B1 and B2, until a defect or significant wear is detected.

The method 100 described above is particularly advantageous, as it allows detecting wear and defect within the powertrain 14, including the electric motor 16, easily. Indeed, the method can be implemented on conventional electric vehicles, without requiring structural modification of such vehicles. Its implementation is therefore simple and inexpensive. In particular, electric motors are generally equipped with the torque and angular position sensors such as those used in the example described above.

Furthermore, the method 100 allows for detecting a large variety of defects, as any defect increasing clearances between mechanical parts of the powertrain 14 is influencing the backlash value B measured by the method.

Moreover, the monitoring of the first direction backlash value B1 and of the second direction backlash value B2, in addition to the monitoring of the backlash value B, allows for a more precise monitoring of the wear within the powertrain 14. As some defects are only affecting the backlash of the powertrain in one direction of rotation of the electric motor, detecting an increase in only one of the backlash values B1 or B2 allows for identifying the location and/or the type of wear within the powertrain.

In addition, the method 100 is without constraint to a driver of the vehicle 10, as it does not alter driving of the vehicle and does not require any driver intervention.

In the example described above, the method 100 is performed with only one gear ratio of the gearbox. Preferably, the method 100 is performed for each gear ratio of the gearbox. Hence, with the vehicle 10 of the example, the method 100 is performed four times. Performing the method 100 for each gear ratio of the gearbox is particularly advantageous, as it allows locating wear within the powertrain 14.

Indeed, if an increase in the backlash value B is more important when the method 100 is performed for a given gear ratio, then it can be concluded that the wear is located at least in mechanical parts of the powertrain 14 which are only driven by the electric motor 16 when the gearbox is set at said gear ratio. For example, if an increase in the backlash value B is only observed when the first dog clutch 48 is engaged with the first main gear 28, then it can be concluded that the wear is located on the first main gear 28 or on the bearings with which the first main gear 28 is mounted onto the main shaft 26 or into the countershaft 34.

In addition, if an increase in the backlash value B is constant, regardless of the gear ratio with which the method 100 is performed, then it can be concluded that the wear is located in mechanical parts of the powertrain 14 which are always driven by the electric motor 16, such as the motor shaft 22 or the output shaft 40.

Furthermore, if an increase in the backlash value B is more important for multiple gear ratios, but not for all gear ratios, then it can be concluded that the wear is located at least in mechanical parts of the powertrain 14 which are driven by the electric motor 16 when the gearbox is set in all of said gear ratios but which are not driven by the electric motor when the gearbox is set in another gear ratio. Hence, said mechanical parts are common gears of said gear ratios.

The vehicle 10 described above is of standard conception. Thus, various modifications can be envisaged without affecting the execution of method 100.

For example, the gearbox can have a number of speed different from four, for example two or eight; and/or a number of dug clutches different from two, for example one or three.

According to other examples, the powertrain 14 does not comprise a differential.

According to other examples, the drivetrain 18 does not comprise a gearbox, but another type of transmission, such as a fixed transmission or a continuously variable transmission.

Therefore, it should be understood that the method 100 described above can be applied to other electric vehicles with a different architecture.

According to other examples, the powertrain 14 comprises multiple electric motors, for example two or three electric motors. For example, the drivetrain 18 comprises two inputs, each electric motor being one input of the drivetrain, and one output, connected to the differential 20. In such examples, the method 100 is performed multiple times, preferably once for each electric motor of the vehicle.

In the example described above, the motor torque delivered by the electric motor 16 to the drivetrain 18 is delivered by the drivetrain to the drive wheels 12 of the vehicle, said drive wheels being mechanical components of the vehicle. According to other examples, the motor torque is delivered by the drivetrain 18 to other mechanical components of the vehicle 10, such as, for example, a compressor, a pump, and/or any other mechanical component requiring an input torque to be driven. In other words, the powertrain 14 is configured to drives mechanical components in rotation. In such examples, the method 100 is performed as described above, with the drivetrain in a coupled configuration and with the mechanical components prevented from moving during the reference cycle 110 and during the analysis cycle 120. Alternatively, the drivetrain 18 can deliver the motor torque of electric motor 16 simultaneously to the drive wheels 12 and to other mechanical components of the vehicle 10.

Furthermore, the method 100 is described above as an example, from which different modification can be envisaged.

According to other examples, the method 100 does not comprises the reference cycle 110. In such an example, the analysis cycle 120 is repeated and the backlash values B, B1 and B2 established during the steps 127 and 128 of the last performed analysis cycle 120 are compared with backlash values B, B1 and B2 established during previously performed analysis cycles 120, to detect an evolution over time of the wear of the powertrain 14.

According to other examples, the backlash values B, B1 and B2 obtained during an analysis cycle 120 are compared to reference values obtained by other means, such as through calculation or with reference vehicles, instead or in addition of being compared to the backlash values $B_{ref}$, $B1_{ref}$ and $B2_{ref}$ obtained during the reference cycle 110 and to the backlash values B, B1 and B2 obtained during the previously executed analysis cycles 120.

According to other examples, the initial reference angular position $\theta0_{ref}$ and the initial angular position $\theta0$ are not measured during the reference cycle 110 and the analysis cycle 120, and therefore, the first and second direction reference backlash values $B1_{ref}$, $B2_{ref}$ and the first and second direction backlash values B1, B2 are not calculated.

Example 1: a method 100 for monitoring the wear of a powertrain 14 of an electric vehicle 10, the powertrain 14 comprising at least one electric motor 16 and a drivetrain 18, the drivetrain being configured to deliver a motor torque produced by the electric motor 16 to mechanical components 12 of the electric vehicle 10 to drive the mechanical components, wherein the method 100 comprises an analysis cycle 120 that includes, in this order:

preventing 121 the mechanical components 12 from moving;

rotating 123 the electric motor 16 in a first direction of rotation until a torque value delivered by the electric motor reaches a predetermined threshold Tmax, a first angular position $\theta1$ of the electric motor 16 being reached;

rotating 125 the electric motor 16 in a second direction of rotation opposite to the first direction of rotation until a torque value delivered by the electric motor reaches the predetermined threshold Tmax, a second angular position $\theta2$ of the electric motor 16 being reached;

calculating 127 a backlash value B of the powertrain 14 on the basis of the first angular position $\theta1$ and of the second angular position $\theta2$, and wherein the method 100 further comprises comparing 130 the backlash value B calculated 127 during the analysis cycle 120 to a reference value $B_{ref}$ to monitor wear of the powertrain 14.

Example 2: the method 100 of example 1, wherein the analysis cycle 120 further includes:

after the rotation 123 of the electric motor 16 in the first direction of rotation, measuring 124 the first angular position $\theta1$ of the electric motor 16;

after the rotation 125 of the electric motor 16 in the second direction of rotation, measuring 126 the second angular position $\theta2$ of the electric motor 16, and wherein the backlash value B is calculated 127 as the difference between the first angular position $\theta1$ and the second angular position $\theta2$.

Example 3: the method 100 of either one of examples 1 and 2, wherein, prior to the rotation 123 of the electric motor 16 in the first direction of rotation during the analysis cycle 120, the electric motor is in an initial angular position $\theta0$, wherein the analysis cycle 120 further includes:

calculating 128 a first direction backlash value B1 of the powertrain 14 on the basis of the first angular position $\theta1$ and of the initial angular position $\theta0$, and calculating a second direction backlash value B2 of the powertrain 14 on the basis of the second angular position $\theta2$ and of the initial angular position $\theta0$, and wherein the method 100 further comprises comparing 130 the first direction backlash value B1 and the second direction backlash value B2 calculated 128 during the analysis cycle 120 to reference values $B1_{ref}$, $B2_{ref}$ to monitor wear of the powertrain 14.

Example 4: the method 100 of examples 2 and 3 considered in combination, wherein the analysis cycle 120 further includes:

prior to the rotation 123 of the electric motor 16 in the first direction of rotation, measuring 122 the initial angular position $\theta0$ of the electric motor, wherein the first direction backlash value B1 is calculated 128 as the difference between the first angular position $\theta1$ and the initial angular position $\theta0$, and wherein the second direction backlash value B2 is calculated 128 as the difference between the initial angular position $\theta0$ and the second angular position $\theta2$.

Example 5: the method 100 of any one of examples 1 to 4, wherein the method 100 further comprises a reference cycle 110, performed before the analysis cycle 120, wherein the reference cycle 110 includes, in this order:

preventing 111 the mechanical components 12 from moving;

rotating 113 the electric motor 16 in the first direction of rotation until a torque value delivered by the electric motor reaches the predetermined threshold Tmax, a first reference angular position $\theta1_{ref}$ of the electric motor 16 being reached;

rotating 115 the electric motor 16 in the second direction of rotation until a torque value delivered by the electric motor reaches the predetermined threshold Tmax, a second reference angular position $\theta2_{ref}$ of the electric motor 16 being reached;

calculating 117 a reference backlash value $B_{ref}$ of the powertrain 14 on the basis of the first reference angular position $\theta 1_{ref}$ and of the second reference angular position $\theta 2_{ref}$, and wherein the reference value against which the backlash value B calculated 127 during the analysis cycle 120 is compared 130 is the reference backlash value $B_{ref}$ calculated 117 during the reference cycle 110.

Example 6: the method 100 of example 5, wherein the reference cycle 110 further includes:

after the rotation 113 of the electric motor 16 in the first direction of rotation, measuring 114 the first reference angular position $\theta 1_{ref}$ of the electric motor 16;

after the rotation 115 of the electric motor 16 in the second direction of rotation, measuring 116 the second reference angular position $\theta 2_{ref}$ of the electric motor 16;

and wherein the reference backlash $B_{ref}$ value is calculated 117 as the difference between the first reference angular position and the second reference angular position.

Example 7: the method 100 of either one of examples 5 and 6, wherein, prior to the rotation 113 of the electric motor 16 in the first direction of rotation during the reference cycle 110, the electric motor is in an initial reference angular position $\theta 0_{ref}$, wherein the reference cycle 110 further includes:

calculating 118 a first direction reference backlash value $B1_{ref}$ of the powertrain 14 on the basis of the first reference angular position $\theta 1_{ref}$ and of the initial reference angular position, and calculating a second direction reference backlash value $B2_{ref}$ of the powertrain 14 on the basis of the second reference angular position $\theta 2_{ref}$ and of the initial reference angular position, and wherein the reference values against which the first direction backlash value B1 and the second direction backlash value B2 calculated 128 during the analysis cycle 120 are compared 130 are respectively the first direction reference backlash value $B1_{ref}$ and the second direction reference backlash value $B2_{ref}$.

Example 8: the method 100 of examples 6 and 7 considered in combination, wherein the initial cycle 110 further includes:

prior to the rotation 113 of the electric motor 16 in the first direction of rotation, measuring 112 an initial reference angular position $\theta 0_{ref}$ of the electric motor, wherein the first direction reference backlash value $B1_{ref}$ is calculated 118 as the difference between the first reference angular position $\theta 1_{ref}$ and the initial reference angular position, and wherein the second direction reference backlash value $B2_{ref}$ is calculated 118 as the difference between the initial reference angular position and the second reference angular position $\theta 2_{ref}$.

Example 9: The method 100 of any one of examples 1 to 8, wherein the analysis cycle 120 is performed:

after a driver of the electric vehicle 10 requests the electric vehicle to start, and before the vehicle actually starts, and/or after a driver of the electric vehicle 10 requests the electric vehicle to stop, and before the vehicle actually stops.

Example 10: the method 100 of any one of examples 1 to 8, wherein the electric vehicle 10 is a rechargeable battery electric vehicle, the electric motor 16 being powered by a battery, and wherein the analysis cycle 120 is performed during a recharge of the battery.

Example 11: the method 100 of any one of examples 1 to 10, wherein the method 100 further comprises repeating the analysis cycle 120 over time to monitor an evolution over time of the backlash values B calculated 127 during the repeated analysis cycles 120.

Example 12: the method 100 of any one of examples 1 to 11, wherein the drivetrain 18 comprises a gearbox having multiple gear ratio, and wherein the method 100 is performed for each gear ratio of the gearbox, to calculate a backlash value of the powertrain 14 for each gear ratio of the gearbox.

Example 13: the method 100 of any one of examples 1 to 12, wherein the mechanical components 12 of the vehicle 10 include drive wheels 12 of the vehicle, and wherein, during the analysis cycle 120 of the method, braking is applied on the vehicle to prevent 121 the movement of the vehicle and of the drive wheels.

Example 14: a vehicle 10, comprising:

mechanical components 12;

a powertrain 14 including at least one electric motor 16 and a drivetrain 18, the drivetrain being configured to deliver a motor torque produced by the electric motor to the mechanical components to drive the mechanical components;

a sensor 17, configured to obtain an angular position of the electric motor 16; and a control unit 60, wherein the control unit 60 is configured to perform the method 100 according to any one of examples 1 to 13.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for monitoring the wear of a powertrain of an electric vehicle, the powertrain comprising at least one electric motor and a drivetrain, the drivetrain being configured to deliver a motor torque produced by the electric motor to mechanical components of the electric vehicle to drive the mechanical components, wherein the method comprises an analysis cycle that includes, in this order:

preventing the mechanical components from moving;

rotating the electric motor in a first direction of rotation until a torque value delivered by the electric motor reaches a predetermined threshold, a first angular position of the electric motor being reached;

rotating the electric motor in a second direction of rotation opposite to the first direction of rotation until a torque value delivered by the electric motor reaches the predetermined threshold, a second angular position of the electric motor being reached;

calculating a backlash value of the powertrain on the basis of the first angular position and of the second angular position, wherein the method further comprises comparing the backlash value calculated during the analysis cycle to a reference value to monitor wear of the powertrain, wherein the method further comprises a reference cycle, performed before the analysis cycle, wherein the reference cycle includes, in this order:

preventing the mechanical components from moving;

rotating the electric motor in the first direction of rotation until a torque value delivered by the electric motor reaches the predetermined threshold, a first reference angular position of the electric motor being reached;

rotating the electric motor in the second direction of rotation until a torque value delivered by the electric motor reaches the predetermined threshold, a second reference angular position of the electric motor being reached;

calculating a reference backlash value of the powertrain on the basis of the first reference angular position and of the second reference angular position, and wherein the reference value against which the backlash value calculated during the analysis cycle is compared is the reference backlash value calculated during the reference cycle.

2. The method of claim 1, wherein the analysis cycle further includes:

after the rotation of the electric motor in the first direction of rotation, measuring the first angular position of the electric motor;

after the rotation of the electric motor in the second direction of rotation, measuring the second angular position of the electric motor, and wherein the backlash value is calculated as the difference between the first angular position and the second angular position.

3. The method of claim 2, wherein, prior to the rotation of the electric motor in the first direction of rotation during the analysis cycle, the electric motor is in an initial angular position, wherein the analysis cycle further includes:

calculating a first direction backlash value of the powertrain on the basis of the first angular position and of the initial angular position, and calculating a second direction backlash value of the powertrain on the basis of the second angular position and of the initial angular position, and wherein the method further comprises comparing the first direction backlash value and the second direction backlash value calculated during the analysis cycle to reference values to monitor wear of the powertrain, wherein the analysis cycle further includes:

prior to the rotation of the electric motor in the first direction of rotation, measuring the initial angular position of the electric motor, wherein the first direction backlash value is calculated as the difference between the first angular position and the initial angular position, and wherein the second direction backlash value is calculated as the difference between the initial angular position and the second angular position.

4. The method of claim 1, wherein, prior to the rotation of the electric motor in the first direction of rotation during the analysis cycle, the electric motor is in an initial angular position, wherein the analysis cycle further includes:

calculating a first direction backlash value of the powertrain on the basis of the first angular position and of the initial angular position, and calculating a second direction backlash value of the powertrain on the basis of the second angular position and of the initial angular position, and wherein the method further comprises comparing the first direction backlash value and the second direction backlash value calculated during the analysis cycle to reference values to monitor wear of the powertrain.

5. The method of claim 1, wherein the reference cycle further includes:

after the rotation of the electric motor in the first direction of rotation, measuring the first reference angular position of the electric motor;

after the rotation of the electric motor in the second direction of rotation, measuring the second reference angular position of the electric motor;

and wherein the reference backlash value is calculated as the difference between the first reference angular position and the second reference angular position.

6. The method of claim 5, wherein, prior to the rotation of the electric motor in the first direction of rotation during the reference cycle, the electric motor is in an initial reference angular position, wherein the reference cycle further includes:

calculating a first direction reference backlash value of the powertrain on the basis of the first reference angular position and of the initial reference angular position, and calculating a second direction reference backlash value of the powertrain on the basis of the second reference angular position and of the initial reference angular position, and wherein the reference values against which the first direction backlash value and the second direction backlash value calculated during the analysis cycle are compared are respectively the first direction reference backlash value and the second direction reference backlash value, wherein the initial cycle further includes:

prior to the rotation of the electric motor in the first direction of rotation, measuring an initial reference angular position of the electric motor, wherein the first direction reference backlash value is calculated as the difference between the first reference angular position and the initial reference angular position, and wherein the second direction reference backlash value is calculated as the difference between the initial reference angular position and the second reference angular position.

7. The method of claim 1, wherein, prior to the rotation of the electric motor in the first direction of rotation during the reference cycle, the electric motor is in an initial reference angular position, wherein the reference cycle further includes:

calculating a first direction reference backlash value of the powertrain on the basis of the first reference angular position and of the initial reference angular position, and calculating a second direction reference backlash value of the powertrain on the basis of the second reference angular position and of the initial reference angular position, and wherein the reference values against which the first direction backlash value and the second direction backlash value calculated during the analysis cycle are compared are respectively the first direction reference backlash value and the second direction reference backlash value.

8. The method of claim 1, wherein the analysis cycle is performed:

after a driver of the electric vehicle requests the electric vehicle to start, and before the vehicle actually starts, and/or after a driver of the electric vehicle requests the electric vehicle to stop, and before the vehicle actually stops.

9. The method of claim 1, wherein the electric vehicle is a rechargeable battery electric vehicle, the electric motor being powered by a battery, and wherein the analysis cycle is performed during a recharge of the battery.

10. The method of claim 1, wherein the method further comprises repeating the analysis cycle over time to monitor an evolution over time of the backlash values calculated during the repeated analysis cycles.

11. The method of claim 1, wherein the drivetrain comprises a gearbox having multiple gear ratio, and wherein the method is performed for each gear ratio of the gearbox, to calculate a backlash value of the powertrain for each gear ratio of the gearbox.

12. The method of claim 1, wherein the mechanical components of the vehicle include drive wheels of the vehicle, and wherein, during the analysis cycle of the method, braking is applied on the vehicle to prevent the movement of the vehicle and of the drive wheels.

13. A vehicle, comprising:

mechanical components;

a powertrain including at least one electric motor and a drivetrain, the drivetrain being configured to deliver a motor torque produced by the electric motor to the mechanical components to drive the mechanical components;

a sensor, configured to obtain an angular position of the electric motor; and a control unit, wherein the control unit is configured to perform the method according to claim 1.

* * * * *